Steel tube    Catalyst liners

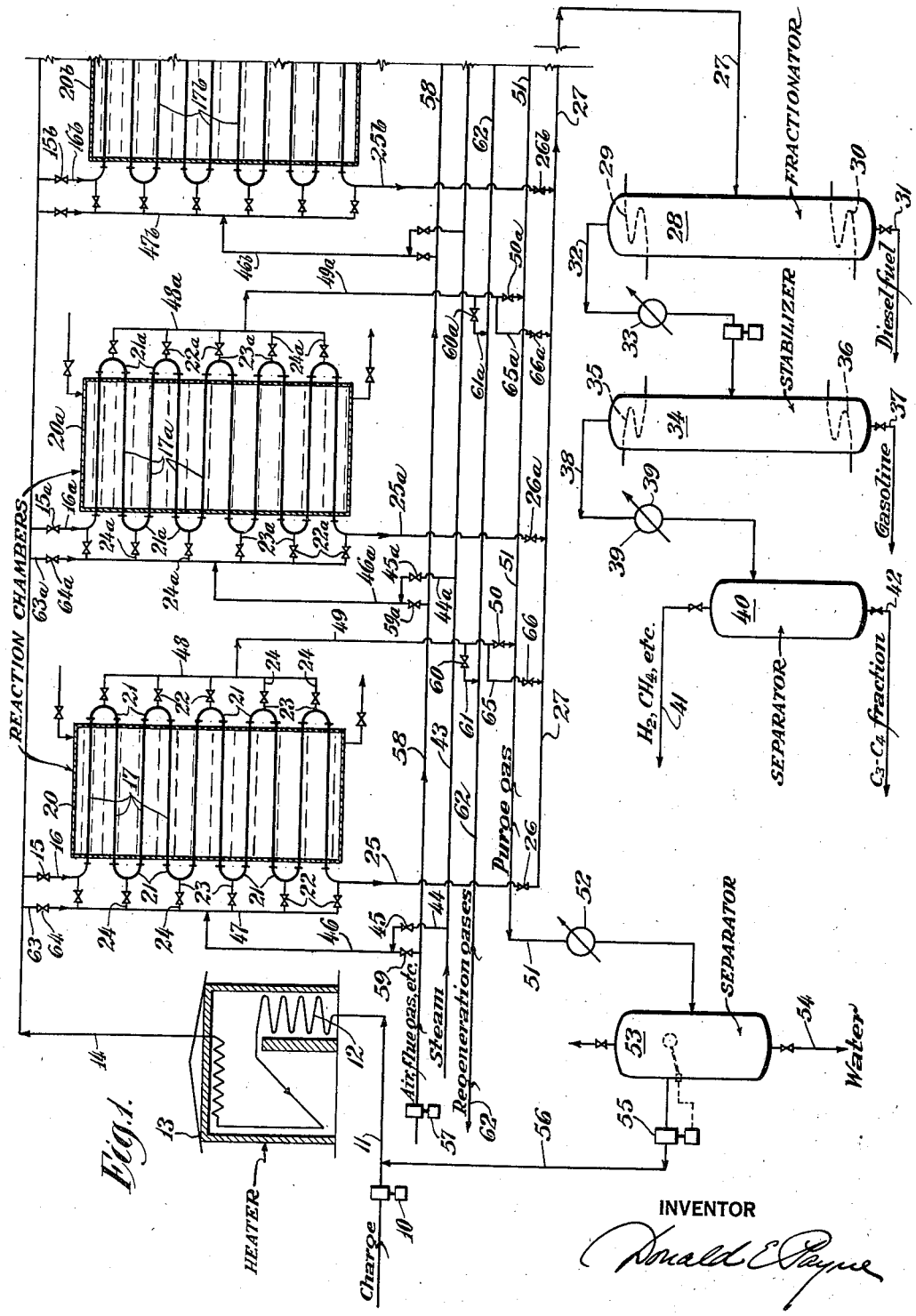

Tubular catalyst liner to be inserted in tube.

Straight corrugations or "rifle bore" to get more contact and turbulent flow.

INVENTOR
Donald E. Payne

Patented Aug. 25, 1942

2,293,946

UNITED STATES PATENT OFFICE 2,293,946

CATALYST CONVERSION SYSTEM

Donald E. Payne, Chicago, Ill., assignor to Standard Oil Company, Chicago, Ill., a corporation of Indiana Application December 20, 1938, Serial No. 246,862

6 Claims. (Cl. 196—52)

This invention relates to a catalytic system and it pertains more particularly to systems of catalytic cracking, dehydrogenation, polymerization, etc., wherein carbon is deposited on the catalyst and has to be burned from the catalyst in a regeneration step.

In catalytic cracking systems the problem of catalyst regeneration is most difficult because rapid oxidation of the deposited carbon tends to overheat the catalyst and render it inactive. The so-called Houdry Process has sought to solve this problem by the provision of an extremely complicated, cumbersome and expensive arrangement of finned tubes closely spaced throughout a catalyst chamber which is filled with contact material. Even in the Houdry system, however, the catalyst particles may be an inch or more from a heat absorbing surface, and great care must be exercised in proportioning the amount of flue gas used to dilute the regeneration air to prevent overheating in the regeneration step. An object of my invention is to provide a simple means for effecting catalytic conversion which will provide sufficient contact for the catalytic conversion step, and which will at the same time avoid the danger of overheating in the regeneration step.

Another problem in catalytic conversion systems is that of forcing regeneration gas, i. e. flue gas mixed with air, through a thick catalyst bed or through a multitude of distributing orifices. An object of my invention is to provide a system wherein there will be unobstructed flow and minimum pressure drop in the regeneration system. A further object is to provide a purging and regeneration system which will operate on at least as short a cycle as the catalyst conversion step so that one catalyst unit will be ready to go on stream as soon as an adjacent catalyst system requires regeneration.

A further object is to provide an improved heat transfer system for insuring substantially constant temperatures during the catalytic conversion step and for preventing overheating of the catalyst during the regeneration step.

A further object is to provide an improved purging system which will effect the recovery of all hydrocarbons remaining in the system at the close of any cycle, and which will eliminate any oxygen-containing gases from the system prior to the introduction of hydrocarbons for conversion.

A further object is to provide an improved means for charging catalysts into catalyst tubes, and for expeditiously changing the flow in the tubes from series to parallel and vice versa, whereby the on stream conversion may be effected by series flow and the purging and regeneration may be effected by parallel flow. Other objects will be apparent as the detailed description of my invention proceeds.

In practicing the invention I form my catalyst into tubular liners which are inserted into the catalyst tubes to form a substantially continuous liner therefor. The thickness of these liners is preferably about one-eighth to one-quarter inch so that they may readily absorb heat from the tubes for the purpose of catalytic conversion, and so that during the regeneration step the heat of carbon oxidation may be quickly dissipated to said tubes without fusing the catalyst or causing any loss of catalyst activity. The tubes may be exposed to hot gases in or from the convection section of a furnace or may be immersed in a fluid such as mercury, diphenyl, molten lead, a fused salt bath, etc.

The heated charging stock is passed through one set of lined tubes in series to effect turbulent flow and to insure sufficient contact, while an adjacent set of tubes is undergoing purging and regeneration with the tubes connected in parallel. When the activity of the catalyst in the first system falls to a predetermined level it is cut off for regeneration and the cracking or other conversion process is effected in the regenerated system.

Before regeneration the tubes are purged with steam (or flue gas) and hydrocarbons are recovered from said steam and returned to the system. Other features and advantages of my improved system will be apparent from the following detailed description, and from the annexed drawings which form a part of this specification, and in which—

Fig. 1 is a flow diagram of my improved catalytic conversion system;

Figure 3:
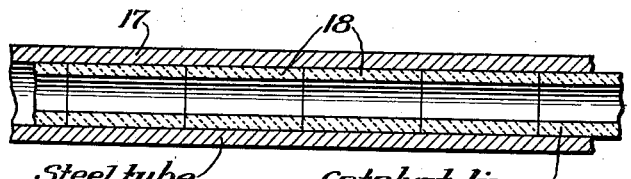
Fig. 3 is a longitudinal cross section of a catalyst tube illustrating the method of positioning the liners therein.

The invention will be described as applied to the catalytic cracking of Mid-Continent gas oil, although it should be understood that any other charging stock may be used. The invention is particularly applicable to the cracking of waxes and wax-bearing oils, both naturally occurring and synthetically produced,—for instance, by the carbon monoxide-hydrogen or carbon monoxide-hydrocarbon synthesis. The invention is also applicable to the catalytic reforming of naphtha, and the dehydrogenation of naphtha or other hydrocarbon oils. It is also applicable to the polymerization or alkylation of hydrocarbon gases by processes employing solid catalysts or catalysts mounted on or carried by solid carriers, particularly when such processes lead to the formation of carbon in the catalyst and require regeneration by burning such carbon with an oxygen-containing gas. The invention may be applicable to other processes than those of hydrocarbon conversion, as will be apparent from the following detailed description.

The charging stock is introduced by pump 10 through line 11 into the coils 12 of pipe still 13, where it is heated to a temperature of about 850° to 1000° F., preferably about 925° F. At this temperature and at a pressure of from about atmospheric to 50 pounds per square inch the vaporized charging stock is conducted through transfer line 14, valve 15 and line 16 to catalyst tubes 17.

The catalyst tubes are preferably made of steel or chromium alloy and may be about 20 or 30 feet long and about 1 to 3 inches inside diameter. Each tube is provided with continuous catalyst liners 18 in the form of tubular sleeves the outside diameter of which is only slightly less than the inside diameter of the tube. These sleeves are about ⅛ to ⅜ inch, preferably about ¼ inch, in thickness and they may be made in suitable lengths of from about 3 to 12 inches. These tubular sleeves may have a smooth cylindrical inner surface or they may be internally corrugated or otherwise deformed to provide additional surface contact area and to promote turbulent flow of gases.

Figure 4:
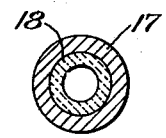
Fig. 4 is a transverse cross section of the catalyst tube and liner.
Figure 2:
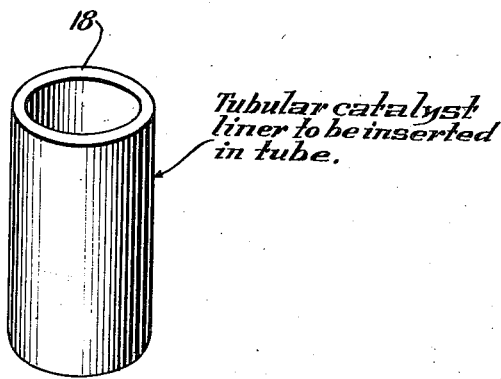
Fig. 2 is an isometric view of a tubular catalyst liner.
Figure 5:
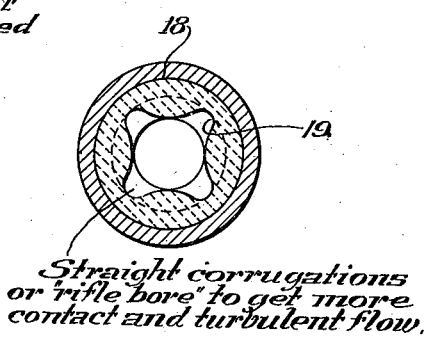
Fig. 5 is a transverse cross section of the catalyst tube and a modified liner designed to give additional contact area and turbulent flow.

In Fig. 2 I have shown a simple cylindrical sleeve; a plurality of which are inserted in the catalyst tube as shown by Fig. 3 to form a continuous internal liner. Fig. 4 shows a cross section of such tube, and Fig. 5 shows a similar cross section of a tube wherein the inner surface of the liner is provided with spiral corrugations 19. It should be understood that any other shape or form of catalyst liners may be used without departing from the spirit of the invention.

For catalytic cracking the tubular catalyst liners are preferably made from acid-treated clay of the type commonly marketed as Super Filtrol, such clays being commonly used for the decolorization of lubricating oils. The acid treated clays may be used as such or they may be impregnated with oxides of various metals such as copper, cadmium, nickel, manganese, etc. Such clay is made into a thick slurry or paste and formed into tubes by any conventional means such, for instance, as a machine used for making tile pipe. These tubes are cut into the desired lengths, preferably about 6 inches, and are heated to a temperature sufficient to drive out moisture and to give them the necessary rigidity and strength for handling. If the clay material itself does not offer sufficient strength an argillaceous or organic binder may be employed but I prefer to avoid the use of any materials which may decrease the porosity of the tube.

Instead of making these tubes from acid treated clay I may employ silica gel impregnated with metal oxides of various metals such as aluminum, copper, nickel, cadmium, manganese, etc. Here again I may employ any suitable binder which may be necessary to prevent the finished tube from being too fragile. Naturally occurring clay such as fuller's earth, Death Valley clay, montmorillonite, bentonite, Wilkinite, etc., particularly when acid treated, and natural zeolites with alkali metals replaced by copper, cadmium, aluminum, manganese, etc., boron silicates, activated aluminum silicates, etc. are further examples of such catalytic cracking catalysts.

For dehydrogenation the catalyst sleeves may be made of chromium oxides or mixtures of chromium oxides with other metal oxides such as copper oxides. Alternatively, they may be made of magnesium chromite, cobalt-nickel borate or any other dehydrogenation catalyst. Here, as in the case of the cracking catalysts, suitable binders may be employed if the catalytic material itself does not result in a finished tube which can be conveniently handled.

For polymerization the tubes may be made with silica, kieselguhr, etc. or other suitable carrier subsequently impregnated with phosphoric acid. Other examples of catalysts and catalyst carriers will be evident from the above examples.

Figure 6:
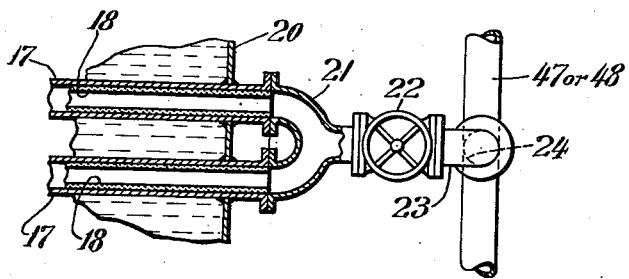
Fig. 6 is a detail partly in section showing the return bend unit and the method of attaching it to the catalyst tubes and the manifold respectively.

The tubes containing the catalyst sleeves may be mounted in the convection chambers of furnace 13 in a chamber through which hot furnace gases are passed. Alternatively, they may be enclosed in a constant temperature chamber 20 which in the present case is a vessel designed to hold a fused mixture of NaNO₃ (sodium nitrate), KNO₃ (potassium nitrate) and NaNO₂ (sodium nitrite), or to hold mercury at a pressure of about 100 to 150 pounds per square inch. The tubes may be welded into such chambers as indicated in Fig. 6, the ends of the tubes projecting therefrom and being provided with flanges to which return bends 21 may be bolted. The return bends preferably form a connection between these tubes and a header which will be hereinafter described, each return bend assembly being provided with a valve 22 and pipe extension 23 which makes a right angle bend so that its flanges may be bolted to pipe 24 in a plane perpendicular to the flanges on tubes 17. This arrangement makes possible the removal of each return bend assembly for the withdrawal or introduction of catalyst sleeves.

The fused salt bath, mercury, diphenyl or other heat exchange fluid in chamber 20 maintains the temperature of all of the catalyst tubes at a constant value of about 925° F. The number and length of tubes will necessarily vary with the particular reaction and charging stock, but in order to insure sufficient contact of hot hydrocarbon vapors with catalyst I prefer to employ a series of such tubes, the final tube leading through line 25, valve 26 and line 27 to fractionator column 28 which is provided with suitable reflux means 29 at its top and reboiler means 30 at its base.

Gas oil, which in this case is an excellent Diesel fuel, is withdrawn from the base of this fractionator through line 31. Overhead gases and vapors are taken through line 32 and condenser 33 to stabilizer 34 which is likewise provided with suitable reflux means 35 and reboiler means 36. Gasoline is withdrawn from the base of the stabilizer through line 37.

The gases withdrawn from the top of the stabilizer through line 38 are partially condensed in cooler 39 and introduced into separator or deethanizer 40, the hydrogen, methane and most of the C$_2$ hydrocarbons being withdrawn through line 41 and the C$_3$—C$_4$ hydrocarbons being withdrawn as a liquid through line 42. It should be understood that any other suitable fractionating system may be employed and that any desired pressures and temperatures may be used therein.

The gas oil fraction may be charged to another catalytic conversion step, although it is preferably subjected to thermal cracking or gas reversion. The C$_3$—C$_4$ fraction may be converted by alkylation with concentrated sulfuric acid or other catalysts or may be employed in a thermal or catalytic gas reversion or polymerization system.

As the catalytic cracking of gas oil proceeds carbon is deposited upon the catalyst, and after a length of run, which may vary from about 10 minutes to 8 hours, preferably one-half hour to one hour, it is necessary to regenerate the catalyst material. The length of run will, of course depend upon the number and size of catalyst tubes as well as on the particular catalyst and the nature of the stock charged. The sequence of steps for regeneration may be as follows:

Valves 15 and 26 are closed while valves 15a and 26a are being simultaneously opened, so that the hot gas oil vapors are cracked in chamber 20a, while the tubes in chamber 20 are being purged and regenerated. Valves 22 which have heretofore been closed are immediately and simultaneously opened and the catalyst tubes are purged with steam which is introduced through line 42, branch line 44, valve 45, line 46 and manifold 47. This steam passes through the return bend assemblies from one end of the tubes to return bend assemblies on the opposite ends of the tubes, and from them is withdrawn through manifold 48, line 49, valve 50 and line 51 to cooler 52 and water separator 53. Condensed steam is withdrawn through line 54 and recovered gas oil is returned by pump 55 (controlled by suitable liquid level control means) through line 56 to charge line 11. Flue gas may, of course, be used instead of steam for purging, and the gas oil may be separated therefrom by conventional means.

The steam purging step only requires a few seconds after which valves 45 and 50 are closed and oxygen-containing gas is introduced by pump 57, line 58, valve 59, line 46 and manifold 47 through the catalyst tubes, the spent regeneration gases being withdrawn through manifold 48, line 49, valve 60, line 61 and line 62. If the fused salt bath, mercury or other heat exchange fluid surrounds the catalyst tubes 17, this regeneration may be effected with air since the close proximity of the catalyst to the tube walls provides for the rapid removal of the heat of regeneration, and thus prevents overheating. I may, of course, introduce flue gas with the air to prevent too rapid an oxidation. Immediately after regeneration valve 59 is closed and valve 45 is opened so that the oxygen-containing gases are swept out of the system by steam. Valves 22 are then closed and tubes 17 are again placed on stream by opening valves 15 and 26.

When the gas oil stream is directed back to the tubes in chamber 20, the tubes in chamber 20a may be regenerated, as hereinabove described. It should be understood that any number of units may be connected to line 14 by lines 16, 16a, 16b, etc., and that each of these units discharges into line 27 through lines 25, 25a, 25b, etc. Similarly, the regeneration and purging lines are manifolded for use on any number of catalyst tube assemblies. Thus one assembly may be on stream while two assemblies are regenerated, or vice versa, and any desired balance of on-stream-to-regeneration cycles may be used.

It should be particularly noted that the cracking is effected with the tubes connected in series, while regeneration is effected with the tubes connected in parallel. When large numbers of tubes are thus employed it will be seen that the time required for purging is only a very small fraction of the amount of time that would be required if the regeneration gases had to follow the same course as the on stream gases. The time required for purging and regeneration is thus reduced to a minimum and the effective on stream period of each catalyst tube assembly is enormously increased. Furthermore, all of the catalyst material is in close proximity to the pipes so that the heat of regeneration is effectively transferred thereto; this prevents overheating of the catalyst and makes possible a rapid regeneration. The heat liberated during the regeneration step may be stored in the pipes and in the heat exchange fluid in chamber 20 to supply the heat of cracking when the assembly returns on stream. Any excess heat over and above that required for cracking may be carried away by hot regeneration gases, or, if desired, the mercury or other liquid in chamber 20 may be boiled under pressure of about 100 pounds per square inch and condensed in a steam power unit so that the excess heat may be used to furnish power for driving the pumps and compressors.

While I prefer to operate in series on stream and in parallel for regeneration, it should be understood that the parallel flow may likewise be used for the cracking step by simply closing valves 15 and 26, introducing the hot gas oil vapors through line 63 and valve 64 in manifold 47 and withdrawing the reaction products through manifold 48, line 49, line 65 and valve 66 to line 27.

The valves throughout my system may be operated by conventional electrical, pneumatic or hydraulic means from a central control room.

In the above description I have described the operation of my invention as applied to the catalytic cracking of gas oil with a clay catalyst. Other catalysts may have other optimum temperatures, but they will usually be about 850 to 925° F.

When the invention is applied to catalytic dehydrogenation the temperatures and pressures are approximately the same as those hereinabove described for catalytic cracking, and as in the case of cracking, low pressures are particularly advantageous. For polymerization with phosphoric acid deposited on kieselguhr the temperature should be about 250° to 600° F. and the pressure about atmospheric to 50 pounds per square inch.

The use of catalyst liners in steel tubes is also particularly advantageous for high pressure reactions, my apparatus being particularly advantageous since it avoids the necessity of large reaction chambers under such high pressure conditions.

While I have described in detail certain preferred embodiments of my invention it should be understood that I do not limit myself to any of the details hereinabove set forth except as defined by the following claims which should be construed as broadly as the prior art will permit.

I claim:

1. The method of catalytically converting hydrocarbons in processes wherein carbon is deposited on the catalyst which comprises heating said hydrocarbons to reaction temperature, and passing the heated hydrocarbons through catalyst-lined tubes connected in series whereby carbon is deposited upon the catalyst, purging said system, regenerating said catalyst by burning said carbon therefrom with said tubes connected in parallel, and effecting regeneration and purging in a period of time substantially equal to the time of catalytic conversion.

2. The method of catalytically converting hydrocarbons in processes wherein carbon is deposited upon the catalyst, which method comprises, heating said hydrocarbons to reaction temperature and passing them through tubes lined with catalyst material and connected in series, purging said tubes with an inert gas while they are connected in parallel, separating hydrocarbons from the inert gas, recycling said hydrocarbons to the heating step, regenerating the catalyst in said tubes while they are connected in parallel, purging the regeneration gases from said catalyst tubes while they are connected in parallel and catalytically converting further amounts of hydrocarbons with said tubes connected in series.

3. In a system for the catalytic conversion of hydrocarbons, a plurality of catalyst lined tubes arranged substantially parallel to each other, a plurality of return bend units each provided with a return bend and a draw-off line, a manifold at each end of said tubes, means for connecting the return bends of each unit to adjacent tubes for effecting a series connection of the tubes, means for connecting the draw-off line of each return bend unit to the manifold adjacent that end of the tubes, a valve between each return bend and its respective manifold whereby the tubes may be effectively connected for both parallel and series flow, conduits for introducing vapors into and withdrawing vapors from said tubes while they are connected in series, means for closing said last-named conduits, means for introducing gases into said tubes from one of said manifolds, and means for withdrawing gases from said tubes through the other of said manifolds.

4. The apparatus of claim 3 which includes flanged connections between return bends and tubes which are at right angles to flange connections between said draw-off lines and manifolds respectively.

5. A catalytic conversion system which comprises means for heating a hydrocarbon oil to a temperature of about 850° to 1000° F., a plurality of catalyst tube systems, a plurality of tubes in each tube system, liners in said tubes comprising catalytic metal oxides, means for selectively connecting the tubes in each system for series or parallel flow, means for passing heated charging stock through said tubes in series flow in one system while another system is being regenerated in parallel flow, means for regenerating the first system in parallel flow and simultaneously passing the heated oil to the second system in series flow, and means for recovering gas oil, gasoline and gases from the reaction products.

6. The system defined by claim 5 wherein the liners in the catalyst tubes comprise pre-formed catalyst sleeves consisting essentially of silica and alumina.

DONALD E. PAYNE.